United States Patent
Balasubramanian et al.

(10) Patent No.: US 11,330,045 B2
(45) Date of Patent: May 10, 2022

(54) LIVE STREAMING SERVER SELECTION

(71) Applicants: AT&T Intellectual Property I, L.P., Atlanta, GA (US); The Regents of the University of California, Oakland, CA (US)

(72) Inventors: Bharath Balasubramanian, Princeton, NJ (US); Zhe Huang, Princeton, NJ (US); Jiasi Chen, Riverside, CA (US)

(73) Assignees: AT&T Intellectual Property I, L.P., Atlanta, GA (US); The Regents of the University of California, Oakland, CA (US)

( * ) Notice: Subject to any disclaimer, the term of this patent is extended or adjusted under 35 U.S.C. 154(b) by 68 days.

(21) Appl. No.: 16/705,926

(22) Filed: Dec. 6, 2019

(65) Prior Publication Data

US 2021/0176300 A1     Jun. 10, 2021

(51) Int. Cl.
*H04L 29/08*     (2006.01)
*H04L 67/101*     (2022.01)
*H04L 65/61*     (2022.01)
*H04L 67/10*     (2022.01)
*H04L 67/1008*     (2022.01)
*H04L 45/00*     (2022.01)
*H04L 65/60*     (2022.01)
(Continued)

(52) U.S. Cl.
CPC ............ *H04L 67/101* (2013.01); *H04L 45/22* (2013.01); *H04L 65/4069* (2013.01); *H04L 65/607* (2013.01); *H04L 65/608* (2013.01); *H04L 67/10* (2013.01); *H04L 67/1008* (2013.01); *H04L 65/80* (2013.01)

(58) Field of Classification Search
CPC ... H04L 67/101; H04L 67/10; H04L 67/1008; H04L 45/22; H04L 65/4069; H04L 65/80
See application file for complete search history.

(56) References Cited

U.S. PATENT DOCUMENTS 6,006,264 A * 12/1999 Colby ................. H04L 67/101
                                                       709/220
6,477,522 B1 * 11/2002 Young ................. H04L 67/101
(Continued)

OTHER PUBLICATIONS

Chen, Jiasi & Balasubramanian, Bharath & Huang, Zhe, "Liv(e)-ing on the Edge: User-Uploaded Live Streams", 2019 IEEE International Conference on Edge Computing (EDGE 2019), Jul. 2019. 6 pages.

*Primary Examiner* — Ramy M Osman

(57) ABSTRACT

A processing system may identify a first set of downloader devices for a first media stream from a first uploader device, where a plurality of servers of a distribution network is available to route the first media stream between the first uploader device and the first set of downloader devices, calculate a first upload bitrate and a first upload server of the plurality of servers for uploading the first media stream, where the calculating may minimize an average latency experienced by a plurality of downloader devices and maximize an average download bitrate for the downloader devices across a set of media streams including the first media stream, where the plurality of downloader devices includes the first set of downloader devices, and where each media stream is associated with a respective uploader device, and assign the first upload bitrate and the first upload server to the first uploader device.

19 Claims, 7 Drawing Sheets

(51) Int. Cl.
*H04L 65/65* (2022.01)
*H04L 65/80* (2022.01)

(56) References Cited

U.S. PATENT DOCUMENTS

| | | | | |
|---|---|---|---|---|
| 8,045,557 B1* | 10/2011 | Sun | ........................ | H04L 45/16 370/390 |
| 8,893,209 B2* | 11/2014 | Albano | ............... | H04L 12/2898 725/120 |
| 9,544,346 B1* | 1/2017 | Chakrovorthy | ..... | H04L 65/4084 |
| 10,700,964 B1* | 6/2020 | Yuan | ....................... | H04L 45/34 |
| 2003/0097564 A1* | 5/2003 | Tewari | ............... | H04L 67/1002 713/171 |
| 2009/0037967 A1* | 2/2009 | Barkan | .............. | H04N 21/6582 725/105 |
| 2009/0103439 A1* | 4/2009 | Zhang | ................. | H04L 67/108 370/235 |
| 2009/0175248 A1* | 7/2009 | Kim | .................... | H04W 74/002 370/336 |
| 2011/0277009 A1* | 11/2011 | Damola | ................. | H04N 7/165 725/116 |
| 2012/0191856 A1* | 7/2012 | Chen | ....................... | H04L 67/26 709/226 |
| 2014/0052825 A1* | 2/2014 | Luecke | ............... | H04L 67/1097 709/219 |
| 2014/0213256 A1* | 7/2014 | Meylan | ................. | H04W 48/18 455/436 |
| 2014/0325577 A1* | 10/2014 | Garcia Mendoza | .... | H04L 67/26 725/115 |
| 2015/0221319 A1* | 8/2015 | Cartwright | ............ | G10L 19/032 704/205 |
| 2017/0078687 A1* | 3/2017 | Coward | ............... | H04N 19/395 |
| 2017/0118706 A1* | 4/2017 | Wang | ................... | H04W 48/20 |
| 2017/0142196 A1* | 5/2017 | Sun | ..................... | H04L 43/0805 |
| 2017/0279881 A1* | 9/2017 | Chang | ................. | H04L 67/1004 |
| 2021/0096911 A1* | 4/2021 | Zhu | ......................... | H04N 7/18 |
| 2021/0144199 A1* | 5/2021 | Sherf | .................. | H04L 67/1008 |
| 2021/0176300 A1* | 6/2021 | Balasubramanian | ........................ | H04L 67/101 |

\* cited by examiner

TABLE 1

| Symbol | Description |
|---|---|
| $d^{up}_{u,i}, d^{down}_{v,i}$ | upload latency between uploader $u$ and server $i$, download latency between viewer $v$ and server $i$ (sec). |
| $b^{up}_{u,i}, b^{down}_{v,i}$ | upload bandwidth between uploader $u$ and server $i$, download bandwidth between viewer $v$ and server $i$ (bits/sec). |
| $h^{up}_{u,i}, h^{int}_{i,j}, h^{down}_{v,i}$ | upload, internal, and download latency of node $i$ (sec). |
| $\mathcal{R}$ | set of possible video rates for video $\{R_1, \ldots, R_M\}$. |
| $M$ | number of of video rates available for uploader $u$. |
| $S$ | set of servers. |
| $U$ | set of uploaders. |
| $V_u$ | set of users viewing the video of uploader $u$. |
| $O_i$ | maximum number of inbound connections that can be served by server $i$. |
| $c_{i,j}$ | capacity of link $l,j$ (bits/sec). |
| $f_l$ | flow on link $l$ (bits). |
| $\alpha$ | parameter trading off viewer latency versus video bitrate. |
| $y_{u,v,i}$ | binary variable indicating whether user $u$ uploads to server $i$. |
| $g_{v,i,i}$ | binary variable indicating whether viewer $v$ downloads from server $i$. |
| $r_{u,v}$ | video rate of uploader $u$ (bits required in the current time epoch). |
| $r_{u,v,i}$ | downloaded video rate for viewer $v$ of uploaded video $u$ (bits required in the current time epoch). |
| $x_{u,v,l}$ | binary variable indicating whether video $u,v$ is sent on link $l$. |

FIG. 2

LATENCY DEFINITIONS $h^{up}_{i,j}(r_{u,i}) = d^{up}_{u,i} + \frac{r_u}{b^{up}_{u,i}}$  Equation 1

$h^{int}_{i,j}(f_l) = \frac{1}{[c_{i,j} - f_l]^+}$  Equation 2

$h^{down}_{v,i}(r_{u,v,i}) = d^{down}_{v,i} + \frac{r_{u,v,i}}{b^{down}_{v,i}}$  Equation 3

PROBLEM 1 minimize $\sum_{u \in U} \sum_{v \in V_u} \left( \sum_i h^{up}_i(r_{u,i}) x_{u,v,i} + h^{down}_i(r_{u,v,i}) g_{v,i} \right)$ $\qquad + \sum_l h^{int}_l(f_l) x_{u,v,l} - \alpha r_{u,v,i}$  (4)

subject to  $\sum_i y_{u,i} = 1, \forall u$  (5)

$\sum_i g_{v,i} = 1, \forall v \in V_u$  (6)

$\sum_u y_{u,i} \leq O_i, \forall i \in S$  (7)

$\sum_{v \in O_i} x_{u,v,l} \geq x_{u,v,l}, \forall u, v, i, l \in O_i$  (8)

$\sum_l x_{u,v,l} \geq r_{u,v,i}, \forall u, v, l$  (9)

$x_{u,v,l} r_{u,v} \leq R^M_{u,v}, \forall u, v, l$  (10)

$y_{u,i} r_{u,v,i} \leq \min(r_{u,v}, b^{down}_{v,i}), \forall u, v, i$  (11)

variables  $x_{u,v,l}, y_{u,i}, g_{v,i} \in \{0, 1\}, \forall u, v, i, l$  (12)

$\qquad r_{u,v}, r_{u,v,i} \in \{R_1, \ldots, R_M\}$

Equation 4

$$u_{u,v}(r_{u,v}) = |V_u|h_S^{up}(r_{u,v}) + \sum_{u \in V_u} h_S^{down}(r_{u,v}(i))) \text{or}_{u,v}(i), r_{u,v} \leq b_{u,v}$$

---

Algorithm 1 One-hop-overlay Network Flow Algorithm

Input: Constants $\mathcal{L}_{u,v}^{up}, \mathcal{L}_{u,v}^{down}, b_{u,v}^{up}, b_{u,v}^{down}, R_1, \ldots, R_M$

Network flow graph construction:

1) Create uploader nodes for each $u \in \mathcal{U}$, connect them to one source node. Create server nodes for each $s \in \mathcal{S}$, connect them to one sink node.
2) For each uploader node, create new data rate nodes for each $R_i \in \mathcal{R}$ and connect. For each server node, connect it to all data rate nodes.
3) Set the capacity of edge between server node $i$ and sink to be $\alpha_i$. Set the capacity of the rest of the edges to be 1.
4) For each uploader $u$, set the cost of edge between server node $i$ and the data rate node $R_a$ to be $u_{u,v}(R_a)$. Assign 0 cost to the rest of the edges.
5) Set the demand of the source node to be $|\mathcal{U}|$.

Minimum cost network flow solution:

1) Apply the cost-scaling push-relabel algorithm to the constructed graph.
2) For each uploader $u$, set $r_{u,i}^* \leftarrow R_a$ if node $u$ is connect to data rate node $R_a$ in the solution. Set $x_{u,i}^* \leftarrow 1$ if the data rate node is further connected to server node $i$. Set $r_{u,v}^* \leftarrow r_{u,v}(i)$ for each $v \in V_u$ according to Lemma 1.

Output: Decision variable values $x_{u,i}^*, r_{u,i}^*, r_{u,v}^*$

PROBLEM 2

$$\min \sum_{u \in \mathcal{U}} \sum_{i \in \mathcal{S}} \sum_{v \in V_u} \left( h_S^{up}(r_{u,v}) + h_S^{down}(r_{u,v}) \right) x_{u,i} - \alpha r_{u,v}$$

subject to (6), (8), (11), (12)

variables $x_{u,i} \in \{0, 1\}, \forall u, i$ $r_{u,v}, r_{u,i} \in \{R_1, \ldots, R_M\}, \forall u, i \in V_u$

*Lemma 1:* For a fixed server $i$, uploader $u$ with upload rate $r_{u,i}$, viewer $v$, and a weight parameter $\alpha$, the objective function in Problem 2 can be minimized by picking the appropriate download rate $r_{u,v}(i)$:

$$r_{u,v}(i) = \begin{cases} R_i, & \text{if } \frac{1}{h_S^{down}} \geq \alpha \\ \max\{r \in \mathcal{R} : r \leq \min(b_{u,v}, r_{u,i})\}, & \text{otherwise} \end{cases}$$

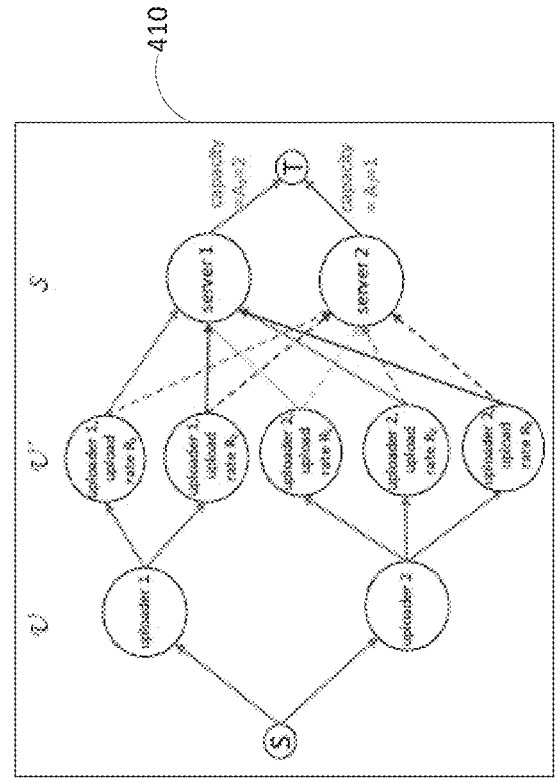

LIVE STREAMING SERVER SELECTION

The present disclosure relates generally to streaming media sessions, and more particularly to methods, computer-readable media, and apparatuses for assigning upload servers and upload bitrates to uploader devices.

BRIEF DESCRIPTION OF THE DRAWINGS

The teachings of the present disclosure can be readily understood by considering the following detailed description in conjunction with the accompanying drawings, in which:

FIG. 2 illustrates latency definitions, an objective function (problem), and a table relating to examples of the present disclosure;

FIG. 4 illustrates an objective function (problem), a lemma, an example network flow graph, an equation, and an algorithm relating to examples of the present disclosure;

FIG. 5 illustrates objective functions (problems) and an equation relating to examples of the present disclosure;

To facilitate understanding, identical reference numerals have been used, where possible, to designate identical elements that are common to the figures.

DETAILED DESCRIPTION

Figure 1:
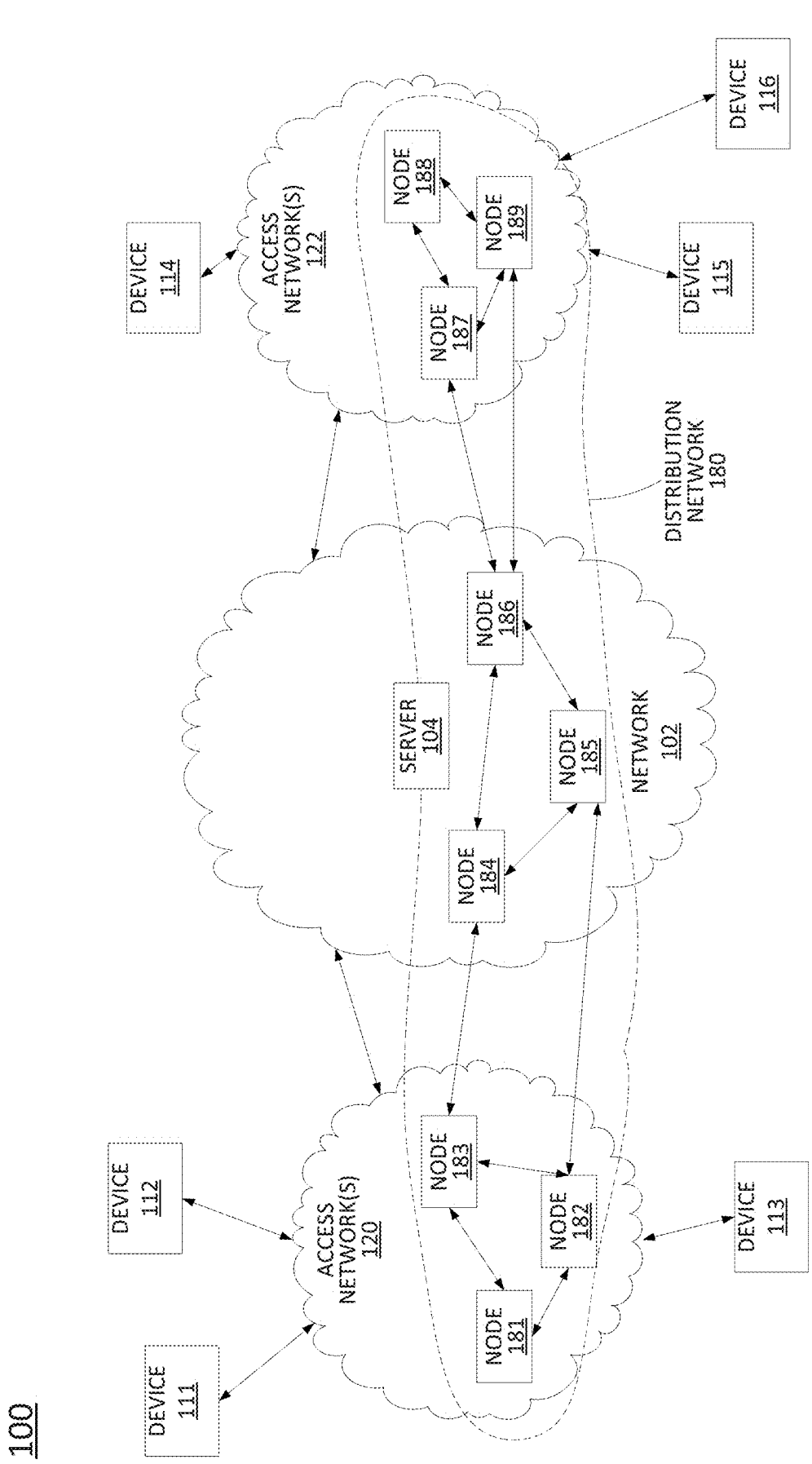
FIG. 1 illustrates an example system related to the present disclosure.

In one example, the present disclosure describes a method, computer-readable medium, and apparatus for assigning an upload server and an upload bitrate to an uploader device. For example, a processing system including at least one processor may identify a first set of downloader devices for a first media stream from a first uploader device, where a plurality of servers of a distribution network is available to route the first media stream between the first uploader device and the first set of downloader devices, and calculate a first upload bitrate and a first upload server of the plurality of servers for uploading the first media stream. The calculating may be to minimize an average latency experienced by a plurality of downloader devices across a set of media streams of the distribution network and to maximize an average download bitrate for the plurality of downloader devices across the set of media streams, where the set of media streams includes the first media stream. In addition, the plurality of downloader devices may include the first set of downloader devices, and each media stream of the set of media streams may be associated with a respective uploader device of a plurality of uploader devices. The processing system may then assign the first upload bitrate and the first upload server to the first uploader device for uploading the first media stream.

Unlike video-on-demand (VoD) and traditional live-streaming in which video is stored by professional content providers and distributed using prevalent content distribution network (CDN) techniques, in user-upload streaming, video may be generated and uploaded on-the-fly by heterogeneous clients with restricted bandwidth and long latencies to the distributor. For instance, most VoD frameworks are based on traditional CDN techniques where content is co-located or located close to a CDN point of presence (PoP). In addition, most frameworks for planned live-streaming of large-scale events (e.g., sports games, presidential speeches, etc.) consider the problem of CDNs deciding how to route content to a reasonably predictable user-base. However, when content is being generated spontaneously by end users (rather than pre-planned large-scale events such as sports games), it cannot be assumed that content is co-located with the distribution network or that high-bandwidth and low-latency connections are available between the content sources and the distribution network. Instead, the users uploading the content may have imperfect, heterogeneous "first-mile" connections with potentially low bandwidth and high latency.

Both VoD and live-streaming may plan and provision for content delivery based on estimation of usage patterns, knowledge of the weaker links in the network, and other relevant parameters. In the case of user-upload streaming, estimation and prediction of usage may be challenging because of the unplanned nature of uploads and the resulting user-base. Since traditional video-delivery techniques may generally contend with a huge national (and/or worldwide) viewer base, heavy-weight technologies may be deployed, such as reflectors in the network. However, these types of solutions may be overkill for user-upload streaming in which the viewer base is in the order of thousands for the most popular streamers.

Examples of the present disclosure are intended for user-upload streaming and provide for upload server and upload bitrate selection for each uploader device (e.g., for each video or other streaming media upload). In particular, examples of the present disclosure may select an appropriate server and select an appropriate upload bitrate that may minimize the average latency and maximize the data rate (e.g., the downloaded video encoding bitrate) for downloader devices (e.g., viewer devices) across all streams served by the distribution network. Even when options for the streamer/uploader device to select the upload server and upload bitrate are available, manually select these parameters by individual streamers often leads to globally suboptimal solutions.

In accordance with the present disclosure, a distribution network may evaluate a current set of uploaders (e.g., uploader devices) and downloaders (e.g., downloader devices) that are uploading and consuming videos (or other streaming media, such as audio, gaming streams, etc.) during a certain window of time, and may solve a holistic problem that minimizes the end-to-end latency and maximizes the download rate experienced by downloader devices based on a choice of a respective upload server and a respective upload bitrate for each uploader device. In one example, the solution to this problem may comprise a set of output parameters to advise uploaders to select upload parameters that balance between the quality-of experience of their own downloaders as well as other streams utilizing the same distribution infrastructure. In one example, the set of output parameters may also be used to advise downloaders of download bitrates (and in some cases a download server) which should be used to obtain respective media streams. In another example, the output parameters may comprise instructions to uploader devices which may be imposed on the upload streams by the distribution network (and in some examples, instructions to downloader devices to impose requirements regarding download bitrates and/or download servers to use for obtaining the respective media streams).

Examples of the present disclosure may address distribution networks that utilize a one-hop overlay architecture or a full-overlay architecture. In a one-hop overlay, for each media stream, the uploader device and downloader devices use the same edge server. The streams may traverse an overlay on the public Internet. However, there is no attempt to control the routing of the streams through multiple links and multiple nodes of the distribution network. On the other hand, in a full-overlay architecture, the distribution network may route streams through an overlay comprising multiple nodes and links of the distribution network. Hence, apart from the upload server and upload bitrate, the distribution network may also control the media stream routing through the overlay links. However, it should be noted that since upload server selection impacts the downstream routing and downlink server selection, it may be impractical (or not ideal) to choose the closest server, as is commonly done for download server selection.

In contrast, examples of the present disclosure maximize the quality-of-experience of all users in the system based on crucial "first-mile" choices of upload server and upload bitrate. For a one-hop overlay architecture, in one example the present disclosure provides a polynomial-time algorithm to identify appropriate upload servers and upload bitrates (and in some cases download bitrates), and that includes formulating a min-cost network flow problem (min-cost max-flow) that considers server load-balancing constraints. For the general full-overlay architecture, the problem is NP-complete. In addition, the present disclosure provides an efficient heuristic that iteratively solves for upload bitrate, routing, and server selection. In one example, the present disclosure further includes an adaption algorithm to minimize perturbations to current solutions during arrivals and departures of uploaders and downloaders.

In one example, the present disclosure assumes a set of independent uploaders, each streaming a video to a set of viewers. The video is distributed through the overlay network of a live streaming service (e.g., a distribution network). Each uploader uploads a stream to an upload server (e.g., an edge server), which transcodes the video into a set of bitrates for viewing. In one example, each upload server accepts a finite number of streams (e.g., due to the limited amount of compute resources available for transcoding). The transcoded streams may be routed through the overlay network to one or more download servers (edge servers), from which the viewers download the stream. The amount of bandwidth available in the overlay network may depend on service-level agreements between the live-streaming service and Internet service providers (ISPs), as well as the amount of other traffic currently present (e.g., besides user-upload video streams).

In one example, the decisions to be made are as follows. Uploader u may decide which bitrate $r_u$ to use, and whether to select upload server i, represented by the binary variable $x_{ui}$. The overlay network may decide whether stream u destined for viewer v should be sent on link l, using the binary variable $z_{uvl}$. Finally, viewer v watching stream u may decide which rate to download at, $r_{uv}$, and which download server i to choose, represented by binary variable $y_{uvi}$. The objective in these decisions is to minimize the total latency and to maximize the viewer-perceived video rate across all the viewers in this system. It should again be noted that examples of the present disclosure are not limited to video streaming, but may relate to different types of streaming media. As such, it should be understood that references herein to video rate may be equally applicable to the streaming bitrate, that the viewer variable v may alternatively or additionally represent a downloader (or download device), and so forth.

In one example, the present disclosure formulates an objective function with four terms: first, minimize the latency between the uploader and the upload server (which may be a function of the round-trip-time (RTT) and the upload bitrate of the uploaded video stream); second, minimize the latency between the download server and the viewer (again a function of the RTT and the bitrate of the transcoded video stream); third, minimize the latency from the internal routing (as a function of the flow bandwidth); and fourth, maximize the viewer-perceived video rate. More precisely, the upload latency $h_i^{up}$, the internal latency $h_i^{int}$, and the download latency $h_i^{down}$ may be defined in accordance with Equations 1-3, respectively, as shown in FIG. 2.

The forms of the upload latency (Equation 1) and download latency (Equation 3) are similar. Each comprises the sum of the queuing delay and the transmission delay. The internal latency (Equation 2) is given by the queuing delay and is modeled by an M/M/1 queue. Given these definitions, in one example, the present disclosure formulates an objective function as illustrated in Problem 1 of FIG. 2. FIG. 2 also illustrates Table 1, which provides relevant descriptions of variables and/or other symbols that are used in Problem 1 (and throughout the present disclosure).

The controllable parameters of Problem 1 are the discrete variables $x_{ui}$, the uploader's server selection; $r_u$, the upload video rate; $y_{uvi}$, the viewer's download server selection; $z_{uvl}$, the routing decisions; and $r_{uv}$, the download video rate. As illustrated in FIG. 2, Problem 1 may include several constraints. For instance, constraint (5) provides that the sum of flows on each link is less than the link capacity. Constraints (6, 7) provide that each uploader (viewer) is connected to one upload (download) server. Constraint (8) provides that each server i may accept at most $a_i$ uploaders, e.g., due to limited transcoding ability on the server and desire for load-balancing. Constraint (9) provides that a stream may only be forwarded on from a node if the stream is received or stored by the node. Constraint (10) provides that the stream only flows outward from a download server with a connected viewer. Constraint (11) provides that the upload video bitrate is less than the bandwidth between the uploader and the upload server. Lastly, constraint (12) provides that the download video bitrate is less than the bandwidth between the viewer and the download server.

Figure 3:
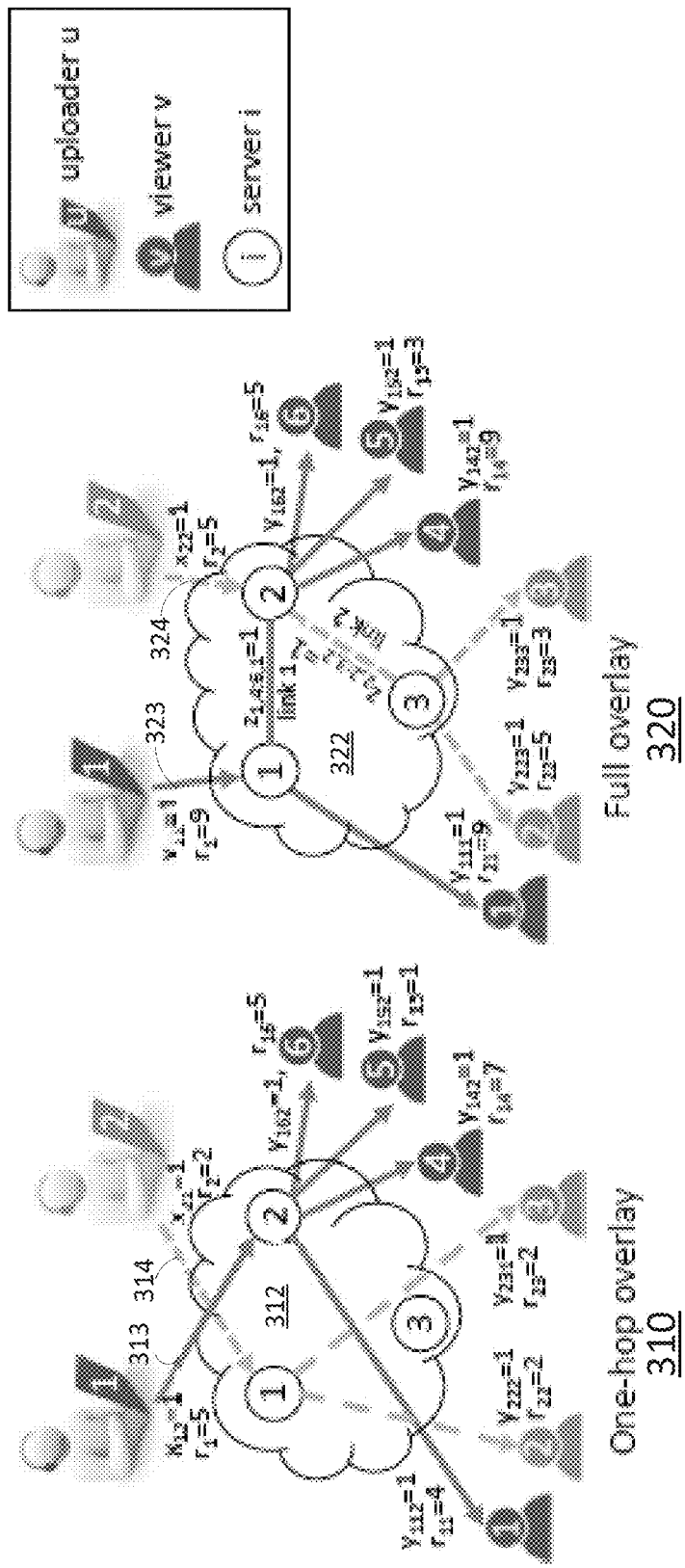
FIG. 3 illustrates examples of one-hop overlay and full-overlay distribution network architectures, in accordance with the present disclosure.

One-hop overlay architecture—as noted above, the present disclosure addresses two types of distribution network architectures. A one-hop overlay architecture is discussed first in greater detail as follows. In a one-hop overlay architecture, both the uploader and the corresponding viewers download from the same (edge) server. An example of a one-hop overlay architecture 310 is illustrated in FIG. 3. In particular, the example one-hop overlay architecture 310 illustrates a distribution network 312 having three nodes (e.g., servers 1, 2, and 3), via which there are two uploaders (1 and 2) streaming a first stream 313 and a second stream 314, respectively. Six downloaders (1-6) are downloading the respective first stream 313 and second stream 314 as shown. In addition, illustrative selected upload servers $x_{ui}$, upload bitrates $r_u$, download servers $y_{uvi}$, and download bitrates $r_{uv}$ are as shown. It should be noted that for each stream, the download servers $y_{uvi}$ are identical to the upload server $x_{ui}$.

In one example, the present disclosure provides a polynomial-time algorithm to solve the problem of assigning upload server(s) and upload bitrate(s) via a reduction to a network-flow problem (e.g., a min-cost max-flow problem). In this architecture, since the download and the upload server are the same for the uploader and the set of viewers, the remaining decision variables are the upload server for each uploader $x_{ui}$, the upload video bitrate $r_u$, and the download video bitrate $r_{uv}$. In this scenario, internal routing latency, $h^{int}$, is ignored since it is confined to the upload/download server and therefore considered negligible. Based on the above, Problem 1 can be re-written for the special case of the one-hop overlay architecture as Problem 2 (shown in FIG. 4).

Problem 2 is a challenging integer non-linear problem where a naive brute-force solution is expensive with time-complexity $O(M^{|V_u|}(M|S|)^{|U'|})$. However, a solution may be obtained with polynomial time complexity by breaking the problem down into two tractable parts. Firstly, in an inner loop, the present disclosure may solve for the download video rate $r_{uv}$ when the upload video rate $r_u$ and upload server $x_{ui}$ are known. It is observed that given the upload rate and upload server, selecting the download rate reduces to a discrete choice between the minimum and maximum possible bitrates. In one example, the inner loop is solved by reducing the problem to an instance of a min-cost network flow problem (e.g., min-cost max-flow). Secondly, in an outer loop, the present disclosure may solve for the upload video rate $r_u$ and upload server $x_{ui}$. These steps are combined and shown in Algorithm 1 (illustrated in FIG. 4). Each of these steps is now described in further detail.

The download rate may be directly calculated when the upload server and upload bitrate are known, as given in Lemma 1 (shown in FIG. 4). For a fixed server i, uploader u with upload rate $r_u$, viewer v, and a weight parameter $\alpha$, the objective function in Problem 2 can be minimized by picking the appropriate download rate $r_{uv}(i)$ per Lemma 1. Notably, when the weight ($\alpha$) is high, video rate is highly favored in the objective function, in which case the highest bitrate is selected (e.g., the highest bitrate that the upload bandwidth and/or the upload bitrate allows). On the other hand, when the viewer's bandwidth is low, the lowest download bitrate is selected. The "in-between" video bitrates are not selected.

Next, in an outer loop, the present disclosure may solve for the upload server and the upload bitrate. In one example, the outer loop comprises iterating over different combinations of server selection $x_{ui}$ and upload rate $r_u$, each time calculating the associated optimal download bitrate according to Lemma 1. However, a brute force approach to solve for the remaining variables $x_{ui}$ and $r_u$ may involve iterating over all possible combinations of uploaders, servers, and upload rates. This approach is inefficient since it has time complexity $O((M|S|)^{|U'|})$ which is exponential in the number of uploaders.

In one example, the present disclosure formulates or transforms Problem 2 into a network graph-based flow problem, which yields an optimal polynomial-time algorithm. An example transformed instance is shown in network graph 410 of FIG. 4, where uploaders are represented by nodes U and replicated M times, according to the number of possible upload bitrates. In the example of FIG. 4, there are two possible upload bitrates for uploader 1, $R_1$ and $R_2$, and three possible upload bitrates for uploader 2, $R_1$, $R_2$, and $R_3$. In addition, there are two possible servers (server 1 and server 2) of a set of possible servers S that may be selected as upload/download servers. Latency (part of the objective in Problem 2) is incorporated into the problem as link weights, and load balancing (constraint 8) as link capacity.

Constraints (6) and (11) are satisfied by construction of the network graph 410, and constraint (12) is satisfied by Lemma 1. The resulting graph problem is solved using minimum-cost network flow algorithms to find the optimal matching solution. To illustrate, the inner terms of the objective function of Problem 2 may be rewritten for a specific uploader u with upload rate $r_u$ selecting server i as Equation 4 (illustrated in FIG. 4). The cost $w_{ui}(r_u)$ is used as the link cost between the set of replicated uploaders U' and the set of servers S. In one example, the network flow instance (e.g., network graph 410) may be constructed and solved for the upload server and upload rate as described in Algorithm 1 (shown in FIG. 4).

Note that when there is no constraint on the number of uploaders (e.g., each server can handle an unlimited number of transcoding instances), then a simple greedy algorithm may be optimal: namely, for each uploader u, pick server $i^*$ according to $(i^*, r_u^*) = \arg \min_{i, r_u} w_{ui}(r_u)$. For example, each uploader may minimize the sum latency to corresponding downloaders, such that the total latency across all streams is also minimized. However, the greedy solution may fail to solve Problem 2 because it may assign many streams to a single edge server, violating the load-balancing constraint (8).

Full-overlay architecture—A full-overlay architecture is where an uploader sends a media stream (e.g., a video stream) to an upload server (e.g., an edge server of the distribution network, or overlay network), the overlay network internally routes the media stream from the upload server to a set of one or more download servers, and downloaders obtain the media stream from the download servers. The full-overlay architecture for live streaming is similar to a content distribution network (CDN), but also includes "first-mile" decisions, which are relatively less important in CDNs because content can be pre-stored on servers. In the context of CDNs, the "last-mile" mapping between viewers and download servers has been studied. For example, a CDN can select the download server with the minimum RTT predicted using historical data, or according to other factors, such as load balancing. In one example, the present disclosure assumes that the live streaming service uses typical CDN download server selection techniques (e.g., the variable $y_{uvi}$ is known). The task of the live streaming service (e.g., of the distribution/overlay network) is to determine: (a) upload server selection and upload video bitrate, and (b) the internal routing.

Figure 5:
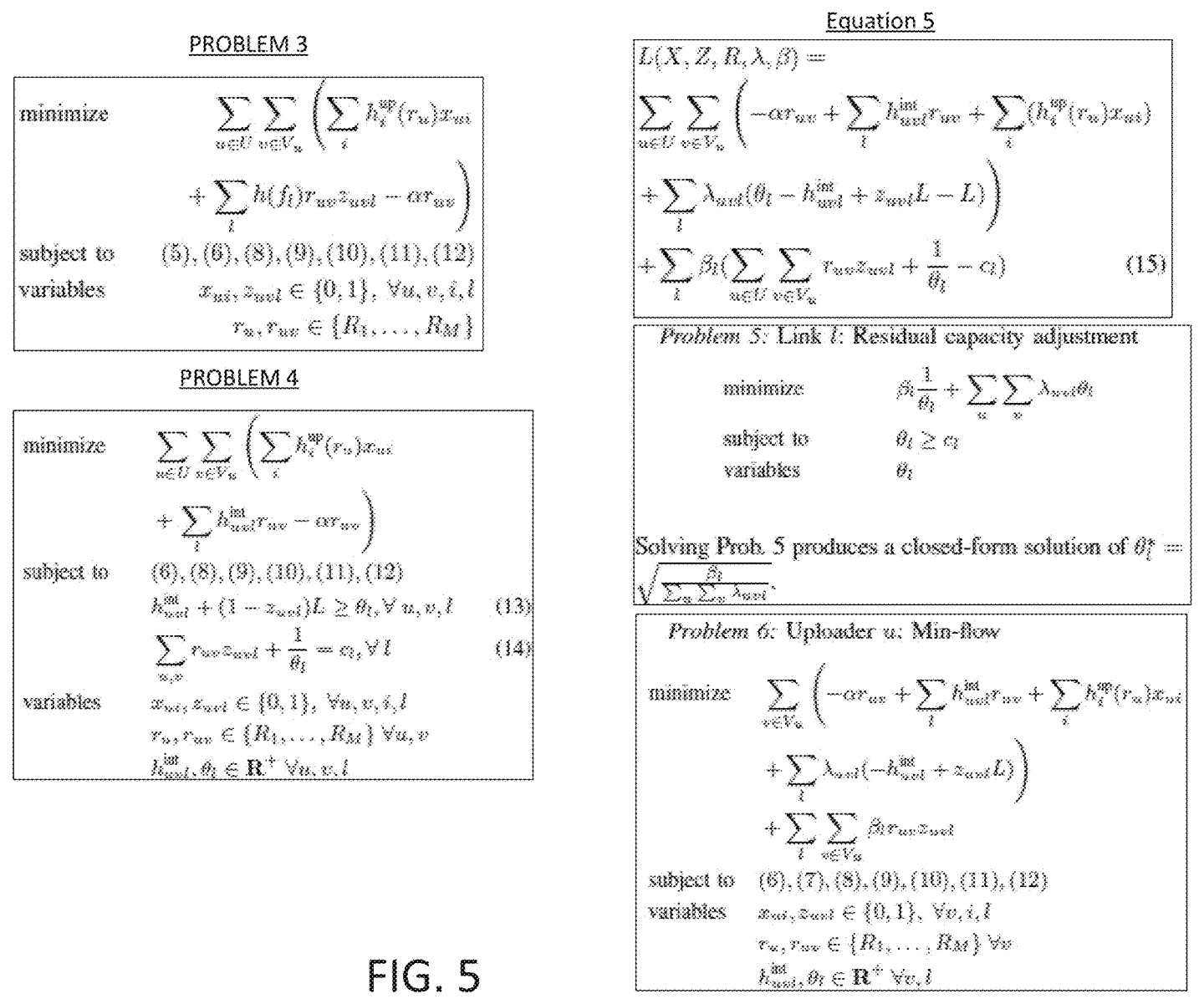

In the case of a full-overlay architecture, in one example, Problem 1 may be reformulated as Problem 3 (illustrated in FIG. 5). Compared to Problem 1, constraint (7) is assumed to be satisfied and is removed, and the objective function is re-written in simplified form. Problem 3 is a non-linear integer problem that is expensive to solve in a brute-force manner. It addition, it may be demonstrated that the decision version of Problem 3 is NP-complete, and so the optimization problem may still be challenging to solve.

Eschewing optimality, in one example the present disclosure provides a heuristic process (e.g., an algorithm) in which the problem is relaxed and iteratively solved for two sets of variables. Specifically, for fixed $x_{ui}$ and $z_{uvi}$, Problem 3 is a convex problem if the relaxation $0 \leq r_u$; $r_{uv} \leq 1$ is allowed. Similarly, for fixed $r_u$ and $r_{uv}$, it can be shown that Problem 3 is a convex problem if the relaxation $0 \leq x_{ui}$; $z_{uvi} \leq 1$ is allowed. In particular, $h^{int}(f_l) r_{uv} z_{uvi}$ is convex. Based on these relaxations, the heuristic process may involve first solving for $x_{ui}$ and $z_{uvi}$, which correspond to the upload servers and the links on which video will be sent, and then solving for $r_u$ and $r_{uv}$, which correspond to the upload and download rates. This may be continued until the difference between values of the objective function over time becomes small (e.g., less than 10 percent change between iterations, less that 5 percent change between iterations, less than 0.5 percent change between iterations, etc.).

In practice, optimization decisions may need to be made for every arrival and departure event of either an uploader or a viewer/downloader. However, it may be impractical to repeatedly solve Problem 3 when these events occur. In one example, Problem 3 is solved in an incremental manner that allows for new upload server(s) and video bitrate(s) selection solutions based on the current solutions with minimal perturbations. To illustrate, in one example, a decomposition solution allows the separation of the main problem into sub-problems for each uploader-viewer pair. Therefore, each time there is an arrival/departure event, recalculation(s) may be made only for the related sub-problem(s). In the present example, $\theta_l$ is defined as the inverse residual capacity of link l, which represents the value of the internal latency at link l according to Equation 2 (shown in FIG. 2). In addition, $h^{int}_{uvl}$ is defined as a slack variable for uploader u, user v, and link l to linearize the internal latency of Equation 2. If L is assumed to be an arbitrarily large value, then Problem 3 may be rewritten as an equivalent Problem 4 (shown in FIG. 5).

It should be noted that the new constraint (14) replaces constraint (5) because the inverse of $\theta_l$ is the residual capacity in link l. Also note that $h^{int}_{uvl}$ appears in only the objective function and constraint (13). For a link l which does not serve the video session between uploader u and viewer v (e.g., $z_{uvl}=0$), a large value L is added to the left hand side of the inequality such that the corresponding constraint (13) is satisfied regardless of the value of $h^{int}_{uvl}$. On the other hand, when $z_{uvl}=1$, constraint (13) requires that hint $h^{int}_{uvl} \geq \theta_l$; since minimizing the objective function pushes $h^{int}_{uvl}$ to its lower bound, $h^{int}_{uvl}=\theta_l$ when $z_{uvl}=1$ and $h^{int}_{uvl}=0$ when $z_{uvl}=0$. Therefore, the altered Problem 4 is equivalent to Problem 3.

To decompose Problem 4, in one example, a dual decomposition technique may be applied to relax the new constraints. For instance, in one example, $\lambda_{uvl}$ is introduced for constraint (13) and $\beta_l$ for constraint (14) (see FIG. 5, Problem 4) to create a Lagrangian equation as set forth in Equation 5 (shown in FIG. 5). The dual decomposition technique is designed to minimize the Lagrangian equation by solving a primal problem and a dual problem. The primal problem is designed to minimize the Lagrangian equation according to the primal variables (e.g., X, Z, R) while the dual problem is to maximize the equation (e.g., Equation 5 in the present example) according to the dual variables (e.g., $\lambda$, $\beta$). In the primal problem, since the $\theta$ variables only appear in the Lagrangian equation, one can separate the decision of $\theta$ from the rest of the primal problem. These sub-problems may be referred to as "residual capacity adjustment problems." For link l, the corresponding residual capacity adjustment problem is given by Problem 5 (shown in FIG. 5).

Next, by relaxing the capacity constraint (14) (see FIG. 5, Problem 4), the video sessions that share network links are no longer coupled by the capacity constraint. Therefore, the primal problem can be further decoupled into primal sub-problems that are associated with individual video uploader sessions. In one example each of these sub-problems may be referred to as a "min-flow problem." For uploader u and all of its viewers in $V_u$, the corresponding min-flow problem can be written as Problem 6 (shown in FIG. 5). In one example, the sub-problem of Problem 6 can be solved using the heuristic process/algorithm described above.

After solving the sub-problems (Problem 5 and Problem 6), the dual problem of updating the dual variables $\lambda$ and $\beta$ is left to be solved. In one example, sub-gradient descent may be used to maximize the value of (15) (see FIG. 5, Equation 5) with respect to the dual variables. Specifically, in the k-th iteration, the dual variable $\lambda_{uvl}$ is updated using the subgradient value of $\eta_l(k)-h_{uvl}^{int}(k)+z_{uvl}(k)L-L$, and $\theta_l$ is updated using the subgradient value of $$\sum_{u \in U} \sum_v r_{uv}(k) z_{uvl}(k) + \frac{1}{\theta_l(k)} - c_l.$$

In this example, $\theta_l(k)$, $h^{int}_{uvl}(k)$, $z_{uvl}(k)$, and $r_{uv}(k)$ are the primal variables produced by solving the primal sub-problems in the k-th iteration. Thus, to summarize, when arrival and departure events occur and an incremental solution is desired, only the affected sub-problems for the uploader (or downloader) and relevant links (Problems 5 and 6) need to be recalculated. The other video streams that are not affected by the arrival of an uploader or the departure of a viewer will not be altered.

The foregoing describes examples of upload server assignment and upload bitrate selection for both single-hop network overlay and full-overlay architectures, primarily with respect to streaming video. However, it should also be noted that examples of the present disclosure may include upload server selection for to videoconferencing services, where each participant in a video conference may be considered as a respective uploader, and where for each uploader/participant the other participants may be considered as downloaders for a media stream from the given uploader/participant. In one example, an additional constraint may be added to any of the above problems/objective functions to select a single server for all media upload and download relating to a teleconference. However, in another example, a videoconference may not be constrained to a single upload server and/or downloader server. Examples of the present disclosure may additionally be utilized to determine CDN server placement. For instance, simulations in accordance with the above may be used to select advantageous placement of new CDN server(s) to reduce average latency and increase average download bandwidths for downloader devices. These and other aspects of the present disclosure are described in greater detail below in connection with the following examples.

To further aid in understanding the present disclosure, FIG. 1 illustrates an example system 100 (e.g., a computing network) in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102 (e.g., a telecommunication network of a telecommunication service provider). The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, Internet service provider (ISP) networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental, or educational institution LANs, and the like.

In one example, the access networks 120 may be in communication with one or more devices 111-113. Similarly, access networks 122 may be in communication with one or more devices, e.g., devices 114-116. Access networks 120 and 122 may transmit and receive communications between devices 111-116, between devices 111-116 and any of nodes 181-189 of distribution network 180, other components of network 102, access networks 120 and/or access networks 122, devices reachable via the Internet in general, and so forth. In one example, each of the devices 111-116 may comprise any single device or combination of devices that may comprise an endpoint device. For example, any one of devices 111-116 may comprise a mobile device, a cellular smart phone, a laptop, a tablet computer, a desktop computer, a wearable computing device, a server, a bank or cluster of such devices, an IoT device, and the like.

In one example, any one or more of devices 111-116 may comprise a computing device or processing system, such as computing system 700, and/or hardware processor element 702 as described in connection with FIG. 7 below, specifically configured to perform various steps, functions, and/or operations in connection with examples of the present disclosure for assigning upload servers and upload bitrates to uploader devices. For instance, any one or more of devices 111-116 may respectively comprise an uploader device or a downloader device device for streaming media sessions in connection with examples of the present disclosure.

As depicted in FIG. 1, system 100 may include a distribution network 180 comprised of various nodes (e.g., nodes 181-189). In one example, distribution network 180 may be operated by a different entity from the network 102, access networks 120, and access networks 122, or by the same entity that operates any one or more of such networks. For instance, in one example, distribution network 180 may be operated by the same entity as the network 102, e.g., a telecommunication service provider. In another example, distribution network 180 may be operated by an entity that has the ability to access and configure the nodes 181-189 by arrangement with the owner(s) and/or operator(s) of network 102, access networks 120, and/or access networks 122, respectively. For instance, any one or more of nodes 181-189 may be hosted on public cloud computing resources that are offered by one or more cloud service providers for use by other entities.

In one example, the distribution network 180 may comprise a content distribution network (CDN). However, it should be understood that the distribution network 180 does not necessarily cache content at the respective nodes 181-189. In particular, examples of the present disclosure may address live user-upload media streams where caching of the media stream content may be a non-issue, or may be optional. It should be noted that the media streams may include video streams, online gaming data streams, audio streams (which may be standalone, or which may be included within a video stream and/or accompany a video stream), etc. In one example, the distribution network 180 may be configured with a one-hop overlay architecture, e.g., where a single node from among nodes 181-189 may be selected as an upload server and download server for each upload media stream. In another example, the distribution network 180 may be configured with a full-overlay architecture, e.g., where a node from among nodes 181-189 may be selected as an upload server for a media stream, and where one or more other nodes (or a same node as the upload server) may be selected from among nodes 181-189 as one or more download servers to deliver the media stream to one or more downloader devices.

In one example, each of nodes 181-189 may be configured to be selected (and may provide the functionality) of both an upload server and a download server. However, in another example, some of nodes 181-189 may only be selectable (and/or may only be configured to function as) an upload server or a download server, respectively. In one example, any of the nodes 181-189 that may be available as an upload server may include a transcoding function. For instance, upload servers in accordance with the present disclosure may transcode an uploaded media stream into one or more bitrate variants/tracks for adaptive bitrate (ABR) streaming. In this regard, nodes 181-189 may each comprise all or a portion of a computing device or processing system, such as computing system 700, and/or hardware processor element 702 as described in connection with FIG. 7 below, specifically configured to perform various steps, functions, and/or operations in connection with examples of the present disclosure for assigning upload servers and upload bitrates to uploader devices.

Figure 6:
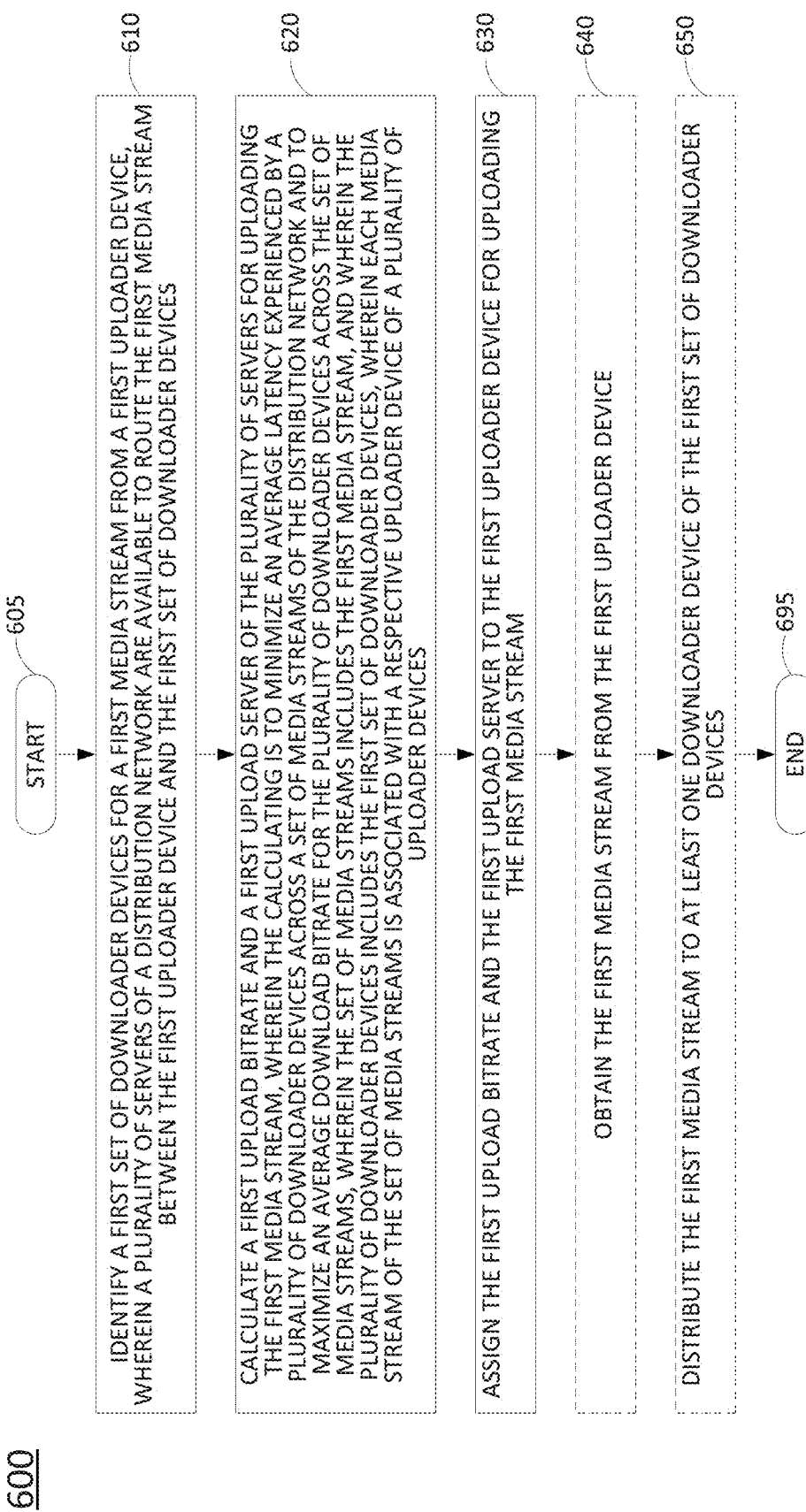
FIG. 6 illustrates a flowchart of an example method for assigning an upload server and an upload bitrate to an uploader device.

In addition, as illustrated in FIG. 1, the network 104 includes a server 104. In one example, server 104 may comprise a computing device or processing system, such as computing system 700 depicted in FIG. 7, and may be configured to provide one or more operations or functions for assigning upload servers and upload bitrates to uploader devices, as described herein. A flowchart of an example method for assigning upload servers and upload bitrates to uploader devices is illustrated in FIG. 6 and discussed in greater detail below.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 7 and discussed below) or multiple computing devices collectively configured to perform various steps, functions, and/or operations in accordance with the present disclosure.

To illustrate, as noted above, various devices 111-116 may comprise uploader devices and/or downloader devices for streaming media sessions in connection with examples of the present disclosure. A streaming media session may comprise an uploading of a media stream by an uploader device to the distribution network 180 and the distribution of the media stream to one or more downloader devices via the distribution network 180. Although examples of the present disclosure are described primarily in connection with live video streaming, it should be noted that other types of media may be similarly processed in accordance with the present disclosure, such as streaming audio (alone or in conjunction with a video stream), streaming media for online gaming, animations, or the like, streaming panoramic and/or 360 degree video, media streams for teleconferencing or shared virtual workspaces, and so forth. In one example, server 104 may configure the streaming media session in accordance with several parameters, e.g., as described in connection with the example method 600 of FIG. 6 and/or as described elsewhere herein. For instance, in one example, server 104 may select an upload server (e.g., one of nodes 181-189) and an upload bitrate for a streaming media session having device 111 as the uploader device and devices 115 and 116 as the downloader devices. In one example, server 104 may further select a download server and a download bitrate for each downloader device. In addition, in one example, server 104 may also select one or more links in the distribution network 180 for routing of the media of the media session from the upload server to the download server and/or to the downloader devices (e.g., for a "full overlay" configuration of distribution network 180). The foregoing is just one example of a streaming media session that may be configured in accordance with the present disclosure. For instance, another streaming media session may relate to device 114 as an uploader device and devices 112, 113, and 115 as downloader devices. In addition, the server 104 may also configure parameters for multiple streaming media sessions via distribution network 180 to jointly minimize the average latency and maximize the video rate experienced by downloader devices across all streams.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, place elements in different networks, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, and the like. Similarly, although only two access networks 120 and 122 are shown, in other examples, access networks 120 and/or 122 may each comprise a plurality of different access networks that may interface with network 102 independently or in a chained manner. For example, device 111 and device 113 may reach network 102 via different access networks, devices 114 and 115 may access network 102 via different access networks, and so forth. In still another example, server 104 may be located in one of the access networks 120 or 122, or may be external to network 102 and access networks 120 and 122. For instance, as noted above, the distribution network 180 may be operated by another entity that does not necessarily own and/or physically control one, several, and/or all of the nodes 181-189, but which may obtain access to and use of the nodes 181-189 according to one or more agreements with one or more operators of network 102, access network(s) 120, access network(s) 122, and so forth. Thus, these and other modifications are all contemplated within the scope of the present disclosure.

FIG. 6 illustrates a flowchart of a method 600 for assigning upload servers and upload bitrates to uploader devices, in accordance with the present disclosure. In one example, the method 600 is performed by a device or processing system of a distribution network. For instance, the method 600 may be performed by server 104 of FIG. 1, or any one or more components thereof, or by server 104 in conjunction with other devices and/or components of system 100 of FIG. 1, e.g., one or more of nodes 181-189 of distribution network 180, one or more uploader devices and/or one or more downloader devices (e.g., any one or more of devices 111-116), and so forth. In one example, the steps, functions, or operations of method 600 may be performed by a computing device or processing system, such as computing system 700 and/or hardware processor element 702 as described in connection with FIG. 7 below. For instance, the computing system 700 may represent any one or more components of the system 100 that is/are configured to perform the steps, functions and/or operations of the method 600. Similarly, in one example, the steps, functions, or operations of the method 600 may be performed by a processing system comprising one or more computing devices collectively configured to perform various steps, functions, and/or operations of the method 600. For instance, multiple instances of the computing system 700 may collectively function as a processing system. For illustrative purposes, the method 600 is described in greater detail below in connection with an example performed by a processing system. The method 600 begins in step 605 and proceeds to step 610.

At step 610, the processing system identifies a first set of downloader devices (e.g., one or more downloader devices) for a first media stream from a first uploader device, where a plurality of servers of a distribution network is available to route the first media stream between the first uploader device and the first set of downloader devices. In addition, in one example, step 610 may further include identifying a plurality of sets of downloader devices, where each set of downloader devices of the plurality of sets of downloader devices is for a respective media stream of a set of media streams.

At step 620, the processing system calculates a first upload bitrate and a first upload server of the plurality of servers for uploading the first media stream, where the calculating is to minimize an average latency experienced by a plurality of downloader devices across a set of media streams of the distribution network and to maximize an average download bitrate for the plurality of downloader devices across the set of media streams. It should be noted that the set of media streams includes the first media stream, the plurality of downloader devices includes the first set of downloader devices, and each media stream of the set of media streams is associated with a respective uploader device of a plurality of uploader devices. In addition, in one example, the plurality of downloader devices may comprise the plurality of sets of downloader devices that may additionally be identified at step 610.

In one example, the distribution network may be configured with a one-hop-overlay architecture. In such case, the first upload server may further function as a download server for the first set of downloader devices. In addition, in such an example, the calculating may be in accordance with an objective function to: minimize a respective upload latency between each respective uploader device of the plurality of uploader devices and a corresponding upload server of the plurality of servers for uploading a respective media stream of the set of media streams that is associated with the respective uploader device, minimize, for each respective media stream of the set of media streams, a respective download latency between each respective downloader device of the plurality of downloader devices that is associated with the respective media stream and the corresponding upload server for downloading the respective media stream, and maximize a download bitrate for each of the plurality of downloader devices. For instance, the objective function may be in accordance with Problem 1 (see FIG. 3) and/or Problem 2 (see FIG. 4).

In one example, the objective function may comprise at least one constraint, including at least one of: a maximum number of uploader devices that may be assigned to a single upload server, a maximum upload bitrate, based upon an available upload link bandwidth (e.g., which cannot exceed a bandwidth between an uploader device and a corresponding upload server), a maximum download bitrate, based upon an available download link bandwidth (e.g., which cannot exceed a bandwidth between a downloader device and a corresponding upload/download server), or a constraint that each uploader device of the plurality of uploader devices is assigned to one upload server. For instance, any one or more of the constraints set forth in Problem 1 or Problem 2 may be incorporated into the objective function. In addition, in one example, the objective function is to output one or more of: respective upload servers from among the plurality of servers to be used by respective uploader devices of the plurality of uploader device for uploading respective media streams of the set of media streams, respective upload rates for the respective uploader devices for uploading the respective media streams, and respective download rates for respective downloader devices of the plurality of downloader devices for downloading the respective media streams. For instance, output variables of the objective function (e.g., a solution thereto) may include $x_{ui}$, $r_u$, and $r_{uv}$ as noted with regard to Problem 1 and Problem 2.

For a one-hop overlay architecture, outputs of the objective function may be calculated in accordance with: a network flow graph (e.g., a min-cost max-flow "network" or "graph") that represents possible upload servers of the plurality of servers, possible upload bitrates, and possible download bitrates, and a minimum cost (min-cost) network flow solution to the network flow graph. For instance, an example network flow graph 410 and an example algorithm to generate and solve the network flow graph are illustrated in FIG. 4. In one example, the minimum cost network flow solution may be obtained by applying a cost-scaling push-relabel algorithm to the network flow graph. In one example, a latency objective may be incorporated as link weights in the network flow graph. In addition, in one example, a load-balancing objective may be incorporated as link capacities in the network flow graph. For instance, link capacities of links between server nodes and a sink node of the network flow graph may be set to fulfill the load-balancing objective. It is noted that the minimum cost network flow solution may output the decision variables $x_{ui}$, $r_u$, and $r_{uv}$, representing an upload server selection for uploader u ($x_{ui}$) the upload bitrate ($r_u$), and a download bitrate for each viewer v ($r_{uv}$).

As described above, in one example, the distribution network may alternatively be configured with a full-overlay architecture. In such case, the calculating of step 630 may be in accordance with an objective function to: minimize a respective upload latency between each respective uploader device of the plurality of uploader devices and a corresponding upload server of the plurality of servers for uploading a respective media stream of the set of media streams that is associated with the respective uploader device, minimize, for each respective media stream of the set of media streams, a respective download latency between each respective downloader device of the plurality of downloader devices that is associated with the respective media stream and a corresponding download server of the plurality of servers for downloading the respective media stream, minimize a latency of internal routing within the distribution network for the set of media streams, and maximize a download bitrate for each of the plurality of downloader devices. For instance, the objective function may be in accordance Problem 1 (see FIG. 2) and/or any one or more of Problems 3-6 (see FIG. 5)

In one example, the objective function may comprise at least one constraint, including at least one of: a maximum number of uploader devices that may be assigned to a single upload server, a maximum upload bitrate, based upon an available upload link bandwidth (e.g., which cannot exceed a bandwidth between an uploader device and a corresponding upload server), a maximum download bitrate, based upon an available download link bandwidth (e.g., which cannot exceed a bandwidth between a downloader device and a corresponding upload server), or constraint that each uploader device of the plurality of uploader devices is assigned to one upload server. The objective function may be to output: respective upload servers from among the plurality of servers to be used by respective uploader devices of the plurality of uploader device for uploading respective media streams of the set of media streams, respective upload rates for the respective uploader devices for uploading the respective media streams, link selections for routing the respective media streams via the distribution network, and respective download rates for respective downloader devices of the plurality of downloader devices for downloading the respective media streams. For instance, a solution to the objective function may comprise an output of the decision variables $x_{ui}$, $r_u$, $r_{uv}$, and $z_{uvi}$ (the latter representing whether a link l will be used for routing a media stream). It should be noted that in one example, download servers may be selected in accordance with a load balancing algorithm of the distribution network.

It should also be noted that in one example, step 620 may include calculating respective upload servers and upload bitrates for each of a plurality of uploader devices (and/or for a plurality of media streams). Step 620 may also include calculating respective download bitrates for each of the plurality of downloader devices (e.g., for each downloader device of each of a plurality of sets of downloader devices associated with different media streams of the plurality of media streams). Additionally, for a full-overlay architecture, step 620 may further include calculating links/paths in the distribution network to route respective media streams from respective upload servers to one or more respective download servers. In other words, step 620 may provide a distribution network-wide optimization to minimize latency and maximize download bitrates for all downloader devices across all of the media streams.

At step 630, the processing system assigns the first upload bitrate and the first upload server to the first uploader device for uploading the first media stream. In one example, step 630 may further include assigning download bitrates to the first set of downloader devices. In addition, in one example, step 630 may include assigning respective upload servers from among the plurality of servers to be used by respective uploader devices of the plurality of uploader devices for uploading respective media streams of the set of media streams, and respective upload rates for the respective uploader devices for uploading the respective media streams. In one example, step 630 may further include assigning download bitrates to the plurality of downloader devices. For instance, as noted above, in one example, step 620 may include calculating $x_{ui}$, $r_u$, and $r_{uv}$ for a plurality of uploader devices and for a plurality of downloader devices associated with each respective uploader device (and/or a respective associated media stream). In addition, for a full-overlay architecture, step 630 may also include assigning media streams to links and/or paths in the distribution network, e.g., where $z_{uvi}$ is calculated at step 620. In this regard, step 630 may comprise transmitting recommendations or instructions (e.g., requirements) to various devices, such as to the first uploader device, to the plurality of downloader devices, to one or more nodes of the distribution network, etc., regarding upload server selection(s), upload bitrate(s), download bitrate(s), download server selection (e.g., where the download server is the same as the upload server for one-hop overlay examples), link selection(s) for media stream(s) for full-overlay examples, and so forth.

At optional step 640, the processing system may obtain the first media stream from the first uploader device. For instance, the processing system may comprise the first upload server and/or one or more other servers of the distribution network. Accordingly, the processing system may obtain the first media stream from the first uploader device in accordance with the assigned first upload server and the assigned first bitrate.

At optional step 650, the processing system may distribute the first media stream to at least one downloader device of the first set of downloader devices. For example, the processing system may include a download server of the distribution network (which in one example may also comprise the first upload server) via which the first media stream may be transmitted to the at least one downloader device, e.g., in accordance with the download bitrate(s) that is/are calculated. In one example, the processing system may also include the one or more other nodes and links which may be used to route the first media stream from the first upload server to download server(s).

At step 695, the method 600 ends.

It should be noted that the method 600 may be expanded to include additional steps, or may be modified to replace steps with different steps, to combine steps, to omit steps, to perform steps in a different order, and so forth. For instance, in one example the processing system may repeat one or more steps of the method 600 at other times with regard to different combinations of media streams, uploader devices, and downloader devices that may seek to utilize and access the distribution network at such other times. In one example, the method 600 may further include determining the plurality of servers of the distribution network that is available to route the first media stream between the first uploader device and the first set of downloader devices (e.g., in addition to being available to route media streams of other uploader devices). In still another example, the method 600 may include calculating a partial solution in response to an arrival or departure of an uploader device or a downloader device. For instance, as noted above, the objective function (e.g., Problem 3) may be solved in an incremental manner that allows for new upload server(s) and video bitrate(s) selection solutions based on the current solutions with minimal perturbations. For example, a decomposition solution may be used to separate the main problem into sub-problems for each uploader-viewer pair (e.g., Problem 3 may be characterized by the equivalent Problem 4, which may be decomposed into Problems 5 and 6, respectively). Therefore, each time there is an arrival/departure event, recalculation(s) may be made only for the related sub-problem(s).

In another example, the method 600 may further include transcoding the first media stream (and/or other media streams) into a plurality of bitrate variants (e.g., as part of optional step 650, or as a separate step between optional steps 640 and 650). In still another example, the method 600 may include the processing system configuring one or more servers and/or one or more links of the distribution network to route the first media stream and/or other media streams, to transcode the first media stream and/or other media streams, etc. (e.g., as part of optional step 650, or as a separate step between optional steps 640 and 650). For instance, the processing system may transmit instructions to various components of the distribution network to configure the distribution network to route the media stream(s) in accordance with the calculations of step 620. Thus, these and other modifications are all contemplated within the scope of the present disclosure.

In addition, although not expressly specified above, one or more steps of the method 600 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 6 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

Figure 7:
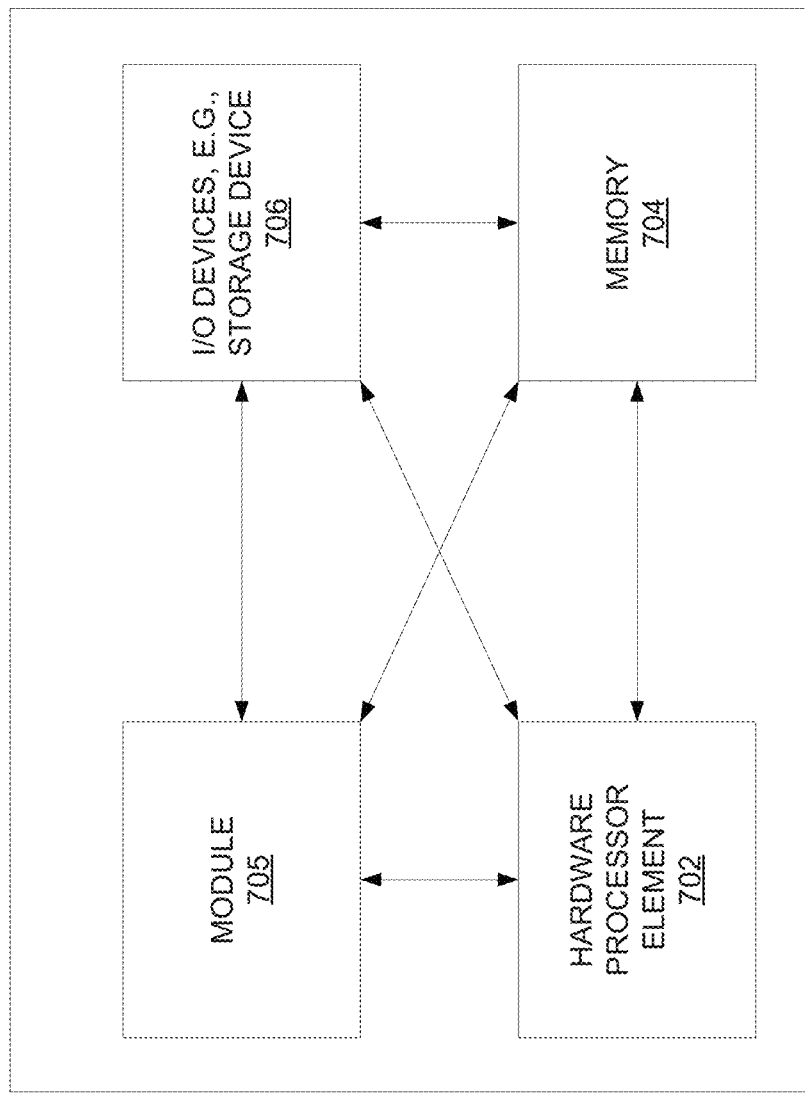
FIG. 7 illustrates a high level block diagram of a computing system specifically programmed to perform the steps, functions, blocks and/or operations described herein.

FIG. 7 depicts a high-level block diagram of a computing system 700 (e.g., a computing device or processing system) specifically programmed to perform the functions described herein. For example, any one or more components or devices illustrated in FIG. 1 or FIG. 3, or described in connection with the method 600 of FIG. 6, may be implemented as the computing system 700. As depicted in FIG. 7, the computing system 700 comprises a hardware processor element 702 (e.g., comprising one or more hardware processors, which may include one or more microprocessor(s), one or more central processing units (CPUs), and/or the like, where the hardware processor element 702 may also represent one example of a "processing system" as referred to herein), a memory 704, (e.g., random access memory (RAM), read only memory (ROM), a disk drive, an optical drive, a magnetic drive, and/or a Universal Serial Bus (USB) drive), a module 705 for assigning upload servers and upload bitrates to uploader devices, and various input/output devices 706, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 702 is shown, the computing system 700 may employ a plurality of hardware processor elements. Furthermore, although only one computing device is shown in FIG. 7, if the method(s) as discussed above is implemented in a distributed or parallel manner for a particular illustrative example, e.g., the steps of the above method(s) or the entire method(s) are implemented across multiple or parallel computing devices, then the computing system 700 of FIG. 7 may represent each of those multiple or parallel computing devices. Furthermore, one or more hardware processor elements (e.g., hardware processor element 702) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 702 can also be configured or programmed to cause other devices to perform one or more operations as discussed above. In other words, the hardware processor element 702 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 705 for assigning upload servers and upload bitrates to uploader devices (e.g., a software program comprising computer-executable instructions) can be loaded into memory 704 and executed by hardware processor element 702 to implement the steps, functions or operations as discussed above in connection with the example method 600. Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 702) executing the computer-readable instructions relating to the above described method(s) can be perceived as a programmed processor or a specialized processor. As such, the present module 705 for assigning upload servers and upload bitrates to uploader devices (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
identifying, by a processing system including at least one processor, a first set of downloader devices for a first media stream from a first uploader device, wherein a plurality of servers of a distribution network is available to route the first media stream between the first uploader device and the first set of downloader devices;
selecting, by the processing system, a first upload bitrate and a first upload server of the plurality of servers for uploading the first media stream, wherein the selecting is to minimize an average latency experienced by a plurality of downloader devices across a set of media streams of the distribution network and to maximize an average download bitrate for the plurality of downloader devices across the set of media streams, wherein the set of media streams includes the first media stream, and wherein the plurality of downloader devices includes the first set of downloader devices, wherein each media stream of the set of media streams is associated with a respective uploader device of a plurality of uploader devices, wherein the selecting is in accordance with an objective function, wherein outputs of the objective function are calculated in accordance with:
a network flow graph that represents the plurality of servers, possible upload bitrates, and possible download bitrates; and
a minimum cost network flow solution to the network flow graph; and assigning, by the processing system, the first upload bitrate and the first upload server to the first uploader device for uploading the first media stream.

2. The method of claim 1, wherein the distribution network comprises a one-hop-overlay architecture.

3. The method of claim 2, wherein the first upload server further functions as a download server for the first set of downloader devices.

4. The method of claim 3, wherein the selecting is in accordance with the objective function to:
- minimize a respective upload latency between each respective uploader device of the plurality of uploader devices and a corresponding upload server of the plurality of servers for uploading a respective media stream of the set of media streams that is associated with the respective uploader device;
- minimize, for each respective media stream of the set of media streams, a respective download latency between each respective downloader device of the plurality of downloader devices that is associated with the respective media stream and the corresponding upload server for downloading the respective media stream; and
- maximize a download bitrate for each of the plurality of downloader devices.

5. The method of claim 4, wherein the objective function comprises at least one constraint, the at least one constraint including at least one of:
- a maximum number of uploader devices that can be assigned to a single upload server;
- a maximum upload bitrate, based upon an available upload link bandwidth;
- a maximum download bitrate, based upon an available download link bandwidth; or
- a constraint that each uploader device of the plurality of uploader devices is assigned to one upload server.

6. The method of claim 4, wherein the objective function is to output:
- respective upload servers from among the plurality of servers to be used by respective uploader devices of the plurality of uploader devices for uploading respective media streams of the set of media streams;
- respective upload rates for the respective uploader devices for uploading the respective media streams; and
- respective download rates for respective downloader devices of the plurality of downloader devices for downloading the respective media streams.

7. The method of claim 1, wherein the minimum cost network flow solution is obtained by applying a cost-scaling push-relabel algorithm to the network flow graph.

8. The method of claim 1, wherein a latency objective is incorporated as link weights in the network flow graph.

9. The method of claim 8, wherein a load-balancing objective is incorporated as link capacities in the network flow graph.

10. The method of claim 1, wherein the identifying comprises identifying a plurality of sets of downloader devices, wherein each set of downloader devices of the plurality of sets of downloader devices is for a respective media stream of the set of media streams, wherein the plurality of downloader devices comprises the plurality of sets of downloader devices.

11. The method of claim 1, wherein the distribution network comprises a full-overlay architecture.

12. The method of claim 11, wherein the selecting is in accordance with the objective function to:
- minimize a respective upload latency between each respective uploader device of the plurality of uploader devices and a corresponding upload server of the plurality of servers for uploading a respective media stream of the set of media streams that is associated with the respective uploader device;
- minimize, for each respective media stream of the set of media streams, a respective download latency between each respective downloader device of the plurality of downloader devices that is associated with the respective media stream and a corresponding download server of the plurality of servers for downloading the respective media stream;
- minimize a latency of internal routing within the distribution network for the set of media streams; and
- maximize a download bitrate for each of the plurality of downloader devices.

13. The method of claim 12, wherein the objective function comprises at least one constraint, the at least one constraint including at least one of:
- a maximum number of uploader devices that may be assigned to a single upload server;
- a maximum upload bitrate, based upon an available upload link bandwidth;
- a maximum download bitrate, based upon an available download link bandwidth; or
- a constraint that each uploader device of the plurality of uploader devices is assigned to one upload server.

14. The method of claim 13, wherein the objective function is to output:
- respective upload servers from among the plurality of servers to be used by respective uploader devices of the plurality of uploader devices for uploading respective media streams of the set of media streams;
- respective upload rates for the respective uploader devices for uploading the respective media streams;
- respective link selections for routing the respective media streams via the distribution network; and
- respective download rates for respective downloader devices of the plurality of downloader devices for downloading the respective media streams.

15. The method of claim 14, wherein download servers are selected in accordance with a load balancing algorithm of the distribution network.

16. The method of claim 1, wherein the plurality of media streams comprises video streams.

17. The method of claim 16, wherein the plurality of upload servers transcodes each video stream into a plurality of bitrate variants.

18. A non-transitory computer-readable medium storing instructions which, when executed by a processing system including at least one processor, cause the processing system to perform operations, the operations comprising:
- identifying a first set of downloader devices for a first media stream from a first uploader device, wherein a plurality of servers of a distribution network is available to route the first media stream between the first uploader device and the first set of downloader devices;
- selecting a first upload bitrate and a first upload server of the plurality of servers for uploading the first media stream, wherein the selecting is to minimize an average latency experienced by a plurality of downloader devices across a set of media streams of the distribution network and to maximize an average download bitrate for the plurality of downloader devices across the set of media streams, wherein the set of media streams includes the first media stream, and wherein the plurality of downloader devices includes the first set of downloader devices, wherein each media stream of the set of media streams is associated with a respective uploader device of a plurality of uploader devices, wherein the selecting is in accordance with an objective function, wherein outputs of the objective function are calculated in accordance with:
- a network flow graph that represents the plurality of servers, possible upload bitrates, and possible download bitrates; and
- a minimum cost network flow solution to the network flow graph; and assigning the first upload bitrate and the first upload server to the first uploader device for uploading the first media stream.

19. An apparatus comprising:

a processing system including at least one processor; and a computer-readable medium storing instructions which, when executed by the processing system, cause the processing system to perform operations, the operations comprising:
- identifying a first set of downloader devices for a first media stream from a first uploader device, wherein a plurality of servers of a distribution network is available to route the first media stream between the first uploader device and the first set of downloader devices;
- selecting a first upload bitrate and a first upload server of the plurality of servers for uploading the first media stream, wherein the selecting is to minimize an average latency experienced by a plurality of downloader devices across a set of media streams of the distribution network and to maximize an average download bitrate for the plurality of downloader devices across the set of media streams, wherein the set of media streams includes the first media stream, and wherein the plurality of downloader devices includes the first set of downloader devices, wherein each media stream of the set of media streams is associated with a respective uploader device of a plurality of uploader devices, wherein the selecting is in accordance with an objective function, wherein outputs of the objective function are calculated in accordance with:
  - a network flow graph that represents the plurality of servers, possible upload bitrates, and possible download bitrates; and
  - a minimum cost network flow solution to the network flow graph; and
- assigning the first upload bitrate and the first upload server to the first uploader device for uploading the first media stream.

* * * * *